United States Patent [19]

St-Pierre

[11] Patent Number: 4,480,851
[45] Date of Patent: Nov. 6, 1984

[54] STOWABLE TRAILER

[76] Inventor: Luc St-Pierre, 1391 Langevin St., St. Hubert, Canada, J4T 1X5

[21] Appl. No.: 422,888

[22] Filed: Sep. 24, 1982

[51] Int. Cl.³ .............................................. B62D 63/06
[52] U.S. Cl. .................................... 280/656; 180/209; 180/906; 280/767
[58] Field of Search .............. 280/789, 656, 400, 43.1, 280/63, 65, 43.13, 43.14, 43.15, 43.16, 47.2, 767; 180/DIG. 2, 209; 105/12, 111; 182/113

[56] References Cited

U.S. PATENT DOCUMENTS

| | | | |
|---|---|---|---|
| 2,688,493 | 9/1954 | Rosemberg | 280/36 |
| 3,747,706 | 7/1973 | Paine | 182/113 |
| 3,785,678 | 1/1974 | Shearer | 280/491 B |
| 3,829,115 | 8/1974 | Rich | 280/656 |
| 4,175,768 | 11/1979 | Thackray | 280/652 |
| 4,239,258 | 12/1980 | Burris | 280/639 |
| 4,372,568 | 2/1983 | Campbell | 280/656 |
| 4,415,181 | 11/1983 | McCall | 280/789 |

Primary Examiner—Richard A. Bertsch
Assistant Examiner—Joseph G. McCarthy

[57] ABSTRACT

This stowable trailer is arranged to take little floor space for stowage while avoiding recourse to a collapsible frame with its inherent disadvantages. This stowable trailer comprises a rigid frame, a pair of stowage wheels attached on one side of the frame to roll the trailer on them while it stands upright on that side. The trailer is provided with road wheel units which are pivotally retractable, so as not to project from the bottom of the trailer in their stowed-away position, and with handles to help rolling the trailer on the stowage wheels.

2 Claims, 5 Drawing Figures

STOWABLE TRAILER

FIELD OF THE INVENTION

This invention relates to a trailer of the type adapted to be easily stowed away.

DESCRIPTION OF THE PRIOR ART

Trailers of the above type have been proposed in order to take little space when not used. That allowed persons with little available space to acquire such trailer. However, those previous stowable trailers were foldable or collapsible in order to take little space. Such previous construction resulted in other inconveniences, such as a trailer which is weaker, rather expensive, subject to malfunctioning of its movable parts, and that required time and care to be opened and closed.

SUMMARY OF THE INVENTION

It is a general object of the present invention to provide a stowable trailer which avoids the above-mentioned disadvantages.

In more specific terms, it is a general object of the present invention to provide a stowable trailer which may be stowed away in a rather small floor space without making the frame of the trailer collapsible and, thus, impairing the strength of the trailer.

It is a more specific object of the present invention to provide a stowable trailer which is made to be moved on one of its sides in and out of a backyard, garage, or the like, and which compactly stands on its end to take little floor space for stowage.

It is an object of the present invention to provide a stowable trailer which is provided with stowage wheels on one of its sides to be rolled away standing upright on that side and which is provided with road wheel units that detract away from their operative position to a stowed position where they do not project from the bottom of the trailer frame.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings, in which.

DETAILED DESCRIPTION OF THE PREFERRED EMBODIMENT

Figure 1:
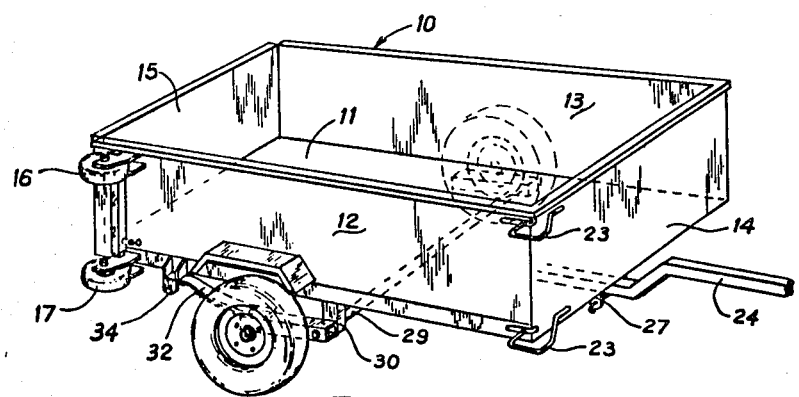
FIG. 1 is a perspective view of a stowable trailer according to a preferred embodiment of the present invention.

The illustrated trailer comprises a frame in the form of a metal box 10 including a bottom 11 and four sides defining opposite lateral sides 12 and 13, a front 14, and a rear end 15.

Figure 2:
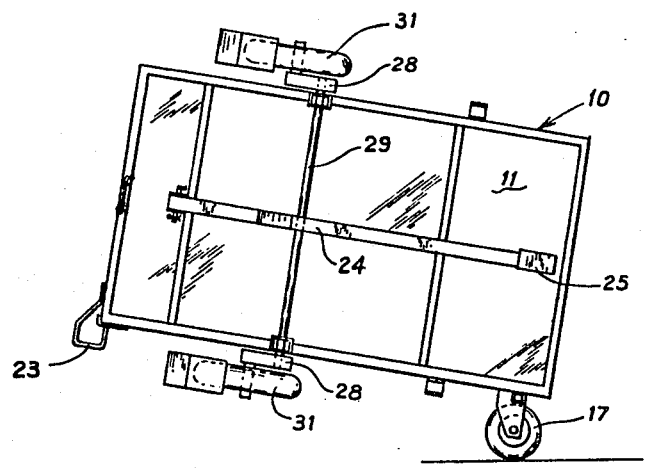
FIG. 2 is a lateral view of the stowable trailer shown standing upright on one of its sides and carried by stowage wheels.
Figure 3:
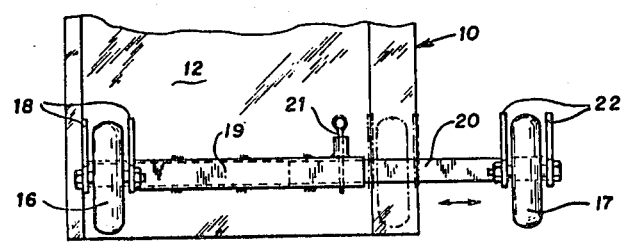
FIG. 3 is a plan view of the stowage wheels and a telescopic connection between them.

The stowable trailer includes also a pair of stowage wheels 16 and 17 attached against the lateral side 12 near its rear edge. The stowage wheel 16 is rotatively carried by a fork-shape bracket 18 which is fixed against the lateral side 12. A telescopic connection longitudinally extends in the axial direction of the stowage wheels 16; 17 and includes an outer tube 19 and an inner tube 20 with the latter telescopically adjustable in the outer tube 19 by a pin 21. A second fork-shaped bracket 22 is fixedly secured on the outer end of the inner tube 20 and rotatively carries the stowage wheel 17. Thus, the latter may be telescopically adjusted axially relative to the stowage wheel 16 to provide the desired transverse stability when used as shown in FIG. 2.

A pair of handles 23 are fixed to the corner of the metal box 10 at the opposite end of the lateral side 12 relative to the stowage wheels.

A tow bar 24 includes an outer end provided with a hitch 25, of any known construction. The inner end of the tow bar 24 is pivotally connected to a bracket 26 to be collapsed against the bottom 11 of the box 10. The tow bar 24 is secured in forwardly-projecting operative position to a bracket 27.

A pair of road wheel units are provided to rollably carry the metal box or frame 10. Each road wheel unit comprises a suspension arm 28 pivoted at one end on a corresponding end of a pivot axle 29 common to both road wheel units. The common pivot axle 29 extends transversely of the trailer, is carried by tubular brackets 30 and has its opposite ends projecting outward laterally of the trailer. Each road wheel unit also includes a road wheel 31 rotatively carried by the other end of the corresponding suspension arm 28. A leaf spring 32 is secured at one end thereof to that other end of each suspension arm 28 and extends in longitudinal alignment with the trailer. The outer end of each leaf spring 32 is bent at 33 to hook onto a supporting pin releasably engaged in a bracket 34 downwardly projecting from the bottom of the trailer.

Figure 5:
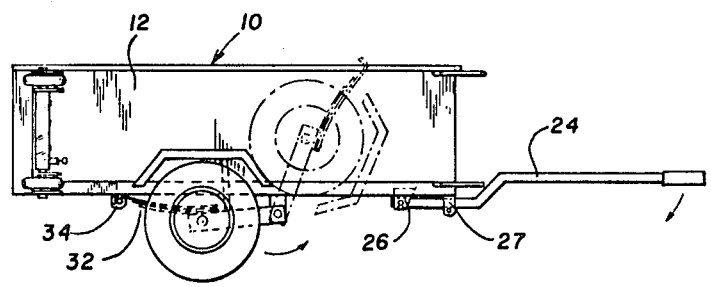
FIG. 5 is a side view of the same stowable trailer.

Thus, in normal use, the road wheel units are positioned with the bent portion 33 of the leaf springs 32 pinned to the brackets 34 and the tow bar 24 is pinned in its forwardly-extending operative position. The stowage wheel 17 is also preferably fully retracted, all as shown in FIGS. 1 and 5.

Figure 4:
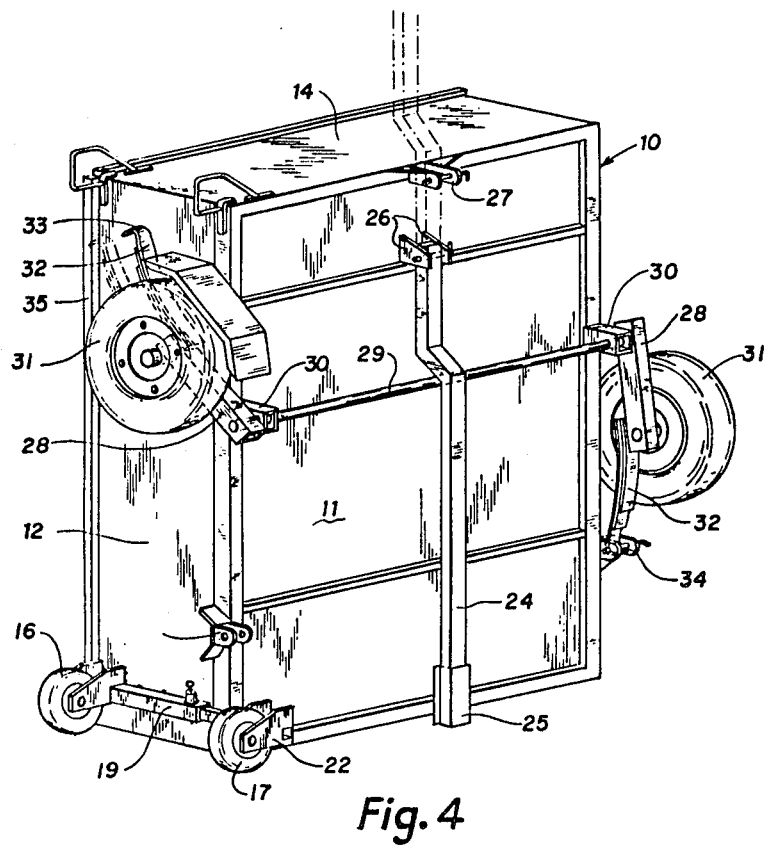
FIG. 4 is a perspective view of the same stowable trailer shown standing on its end in stowed position.

The trailer is stowed away by telescopically adjusting or extending the stowage wheel 17 axially relative to the stowage wheel 16 to provide a larger wheel track. The trailer is then tilted on its side 12 to carry it on its stowage wheels 16 and 17. The tow bar 24 is collapsed against the bottom of the trailer and the latter may then be rolled on the wheels 16 and 17 by holding the handles 23, as shown in FIG. 2. The trailer could be left on its side 12 but preferably occupies less floor space by standing it on its rear end 15, as shown in FIG. 4. In order to take less floor space and to provide stability, the bent end 33 of each leaf spring is freed from the corresponding bracket 34 and the road wheel unit is pivoted to a stowage or rest position, as shown for the left side, in FIG. 4. The end 33 thus rests against the upper rim 35 of the side 12 under gravity and is fully retracted from projection outward from the bottom 11.

What I claim is:

1. A stowable trailer comprising, in combination, a frame defining a bottom and sides including a pair of opposite lateral sides, a pair of road wheel units connected to the frame and displaceable relative thereto between an operative position downwardly projecting from the bottom of the frame and a retracted stowage position laterally outward of the corresponding opposite lateral sides and upward relative to the bottom of the frame, each said road wheel unit including a suspension arm pivoted at one end to the frame, a road wheel rotatively carried by the suspension arm, and a spring releasably connecting the suspension arm to the frame and constructed and arranged for the displacement of the road wheel units between the downward operative position and the upward retracted position, each said road wheel unit being pivoted about a transverse axis relative to the frame, and stowage wheels operatively secured to said frame; wherein said trailer is tiltable from a road position, where said road wheel units are in said operative position with the ground, to a stowage position, where the trailer is upstanding edgewise on one of said sides and rollingly carried by side stowage wheel; wherein a common pivot axis extends transversely of the frame and defines opposite outer ends and the suspension arms of the road wheel units are pivoted at said outer ends respectively and arranged for pivotal displacement of the road wheel units relative to the frame between said downward operative position and upward retracted position; said spring including a leaf spring secured to the corresponding suspension arm at one end, aligned with the same suspension arm longitudinally of the frame, and having the other end releasably attachable to the frame and releasably pinned relative to the frame, so that said trailer one side constitutes the end of the frame forming a base and constructed and arranged to stow and stand the trailer thereon in upstanding edgewise stowage position; wherein the stowage wheels are secured against one lateral side of the frame and operatively project therefrom to rollingly support and move the frame for stowage and unstowage of the trailer, wherein the stowable wheels include a first stowage wheel secured to said one lateral side, a second stowage wheel, and a telescopic arm carries the second stowage wheel in axial position telescopically adjustable relative to the stowage wheels.

2. A stowable trailer as defined in claim 1, further including handles and a tow bar, the latter having an outer hitch end and an inner end, the latter being pivotally pinned under the bottom of the frame at the front of the trailer and the tow bar being collapsible to a stowage position against the underside of said bottom, and the handles being attached to the frame at the opposite end of said one lateral side relative to the stowage wheels.

* * * * *